Patented Apr. 21, 1925.

1,534,741

UNITED STATES PATENT OFFICE.

JAKOB SCHWARZKOPF, OF ELMSHORN, GERMANY.

FODDER FROM FISH OR TRAIN OIL AND EMULSIONS THEREOF AND METHOD OF PREPARING THE SAME.

No Drawing.  Application filed October 28, 1924.  Serial No. 746,401.

*To all whom it may concern:*

Be it known that I, JAKOB SCHWARZKOPF, a citizen of the German State, residing at 9 Muhlenstrasse, Elmshorn, in Holstein, Germany, have invented certain new and useful Improvements in Fodder from Fish or Train Oil and Emulsions Thereof and Method of Preparing the Same, of which the following is a specification.

In connection with cattle breeding fish or train oil is frequently used, either in the pure form or in the form of an emulsion. Owing to its fluid state it is very difficult to deal with. In preparing it for use, which is almost always entrusted to farm hands, frequently too much or too little is given. It often happens that some of it is lost by being upset or by being spilt over. Another drawback is that the barrels usually leak. To this may be added that the price of the fish or train oil or the emulsion is considerably increased by the cost of the transport in barrels. Experiments have shown that all these drawbacks may be avoided when the fish or train oil or the emulsion is absorbed by other substances, such as bran, broken oil cake, meal, peat and the like. By this means a handy, durable, dry product is obtained, which is readily transported in ordinary sacks and is free from lumps, more particularly when the liquid is incorporated in the absorbent substance in a heated state. A further advantage obtained by the absorption of the oil or emulsion is that the digestibility of the oil and the like is considerably increased. While fish or train oils, when given without being previously absorbed, have a purgative action, which is a sign that a portion reaches the intestines without being digested, there is no such purgative action in the case of absorbed fish or train oil or emulsion, which is a proof that it is more readily digested. The fish or train oil or emulsion enters the fine cells of the absorbent substance, more particularly if it is previously heated, and while being digested comes out of the cells again in a very fine layer, so that a greater surface is offered to the digestive juices, which explains the improved digestibility.

What I claim is:—

1. A method of rendering fish and train oils more handy for feeding purposes and more digestible, consisting in causing the fish or train oil to be absorbed by bran, meal, broken oil cake, peat and the like, as set forth.

2. A method of rendering emulsions of fish and train oils more handy for feeding purposes and more digestible, consisting in causing the said emulsions to be absorbed by bran, meal, broken oil cake, peat and the like, as set forth.

3. A method of rendering fish and train oils more suitable for feeding purposes and more digestible, consisting in heating the fish or train oil and causing the latter to be absorbed by bran, meal, broken oil cake, peat and the like.

4. A stock food comprising fish oil absorbed in bran, meal or the like.

In testimony whereof I affix my signature in presence of two witnesses.

JAKOB SCHWARZKOPF.

Witnesses:
 PAUL STEINMETZ,
 C. RASPAECH.